3,029,235
HALOCYCLOALKADIENIC DERIVATIVES OF
N-(ALKYNYL)PHENOTHIAZINES
John P. Luvisi, Park Ridge, Ill., assignor to Universal Oil Products Company, Des Plaines, Ill., a corporation of Delaware
No Drawing. Filed June 15, 1959, Ser. No. 820,085
11 Claims. (Cl. 260—243)

This invention relates to new compositions of matter and to a method for the preparation thereof. More specifically the invention relates to a method of preparing new compositions of matter comprising halocycloalkadienic derivatives of N-(alkynyl)phenothiazines.

It has now been discovered that new compositions of matter comprising the aforementioned cycloalkadienic derivatives of N-(alkynyl)phenothiazines may be prepared by condensing a conjugated haloalkadiene or conjugated halocycloalkadiene with an N-(alkynyl)phenothiazine. These compounds will find a wide variety of uses in the chemical field. For example, the condensation product of hexachlorocyclopentadiene and N-(1-propynyl)phenothiazine, namely, N-(3-methyl-1,4,5,6,7,7-hexachloro-2,5-norbornadien-2-yl)phenothiazine, may be used as an insecticide, especially against houseflies. In addition, the Diels-Alder adducts of this invention may also be used as oxidation inhibitors or as intermediates in the preparation of resins, pharmaceuticals, plastics and the like. For purposes of this invention, the term "halocycloalkadienic" will refer to both monohalocycloalkadienes, polyhalocycloalkadienes, monohalobicycloalkadienes and polyhalobicycloalkadienes when used throughout this specification and the appended claims.

It is therefore an object of this invention to provide a method for the preparation of novel compositions of matter which will find a wide variety of use in the chemical field.

A further object of this invention is to provide a method for the preparation of novel compositions of matter comprising halocycloalkadienic derivatives of N-(alkynyl)phenothiazines.

One embodiment of this invention resides in a process for the preparation of a Diels-Alder adduct which comprises condensing an N-(alkynyl)phenothiazine with a compound selected from the group consisting of conjugated haloalkadienes and conjugated halocycloalkadienes at condensation conditions.

A further embodiment of this invention resides in a process for the preparation of a Diels-Alder adduct which comprises condensing an N-(alkynyl)phenothiazine with hexachlorocyclopentadiene at a temperature in the range of from about 50° to about 225° C. and at a pressure in the range of from about atmospheric to about 100 atmospheres.

Yet another embodiment of the invention resides in a compound selected from the group consisting of

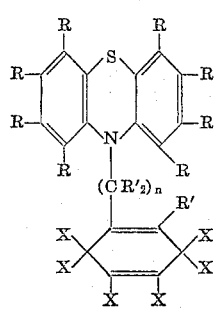

and

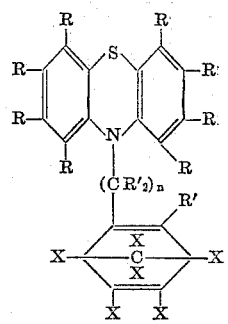

in which the R's are independently selected from the group consisting of hydrogen, alkyl, aryl, alkaryl, aralkyl and alkoxy radicals the R"s are independently selected from the group consisting of hydrogen and alkyl radicals containing from about 1 to 12 carbon atoms, the X's are independently selected from the group consisting of hydrogen and halogen radicals, at least one X being halogen and $n$ is an integer of from 0 to about 12.

A specific embodiment of the invention is found in a process for the preparation of N-(2-methyl-3,4-dichloro-1,4-cyclohexadien-1-yl)phenothiazine which comprises condensing 1,2-dichloro-1,3-butadiene with N-(1-propynyl)phenothiazine at a temperature in the range of from about 150° to about 200° C. and at a pressure in the range of atmospheric to about 100 atmospheres.

Yet another specific embodiment of the invention is found in N-(3-methyl-1,4,5,6,7,7-hexachloro-2,5-norbornadien-2-yl)phenothiazine.

Other objects and embodiments referring to alternative N-(alkynyl)phenothiazines, conjugated haloalkadienes and conjugated halocycloalkadienes will be found in the following further detailed description of the invention.

The process of this invention comprising a Diels-Alder type condensation in which the halogenated conjugated alkadiene or halogenated conjugated cycloalkadiene is condensed with an N-(alkynyl)phenothiazine to form a Diels-Alder adduct will take place at an elevated temperature in the range of from about 50° to about 225° C. or more and often preferably at a temperature in the range of from about 150° to about 200° C., the temperature depending upon the reactants which are to be condensed. Generally speaking, the condensation is effected at atmospheric pressure; however, if higher temperatures are used when condensing a lower boiling halogenated diene with the N-(alkynyl)phenothiazine, superatmospheric pressures ranging from about 2 to about 100 atmospheres or more will be used, the amount of pressure so used being necessary to maintain at least a portion of the reactants in the liquid phase. In addition, if so desired, the condensation will take place in the presence of inert organic solvents, such solvents including aromatic hydrocarbons such as benzene, toluene, o-, m- and p-xylene, ethyl benzene, etc.; paraffinic hydrocarbons, both straight chain and cyclic in nature such as pentane, hexane, heptane, cyclopentane, methylcyclopentane, ethylcyclopentane, cyclohexane, methylcyclohexane, dimethylcyclohexane, etc.; alcohols such as methyl alcohol, ethyl alcohol, propyl alcohol, etc.; ethers such as dimethyl ether, diethyl ether, dipropyl ether, etc.; or acetone, acetic acid, etc.

Unsaturated conjugated diolefinic compounds containing at least one halogen substituent which may be reacted with the N-(alkynyl)phenothiazine in the process of the present invention include straight-chain diolefins having the general formula:

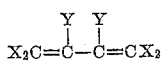

in which the X's are independently selected from the group consisting of hydrogen or halogen radicals having an atomic weight of from 35 to 127 (i.e. chlorine, bromine or iodine), at least 1 of the X's being halogen and Y is independently selected from the group consisting of alkyl, haloalkyl, halogen and hydrogen radicals; or polyhalocycloalkadienes having the general formula:

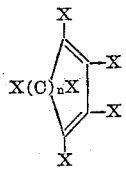

in which the X's have the same meaning as above and $n$ is 1 or 2. Examples of these compounds include haloalkadienes such as 1-chloro-1,3-butadiene,
1,2-dichloro-1,3-butadiene,
1-bromo-1,3-butadiene,
1,2-dibromo-1,3-butadiene,
1,3-diiodo-1,3-butadiene,
1,1,3-trichloro-1,3-butadiene,
1,1,3-tribromo-1,3-butadiene,
1-iodo-1,3-butadiene,
1,2-diiodo-1,3-butadiene,
1,1,3-triiodo-1,3-butadiene,
1,1,2-trichloro-1,3-butadiene,
1,1,2-tribromo-1,3-butadiene,
1,1,2-triiodo-1,3-butadiene,
1,1,4-trichloro-1,3-butadiene,
1,1,4-tribromo-1,3-butadiene,
1,1,4-triiodo-1,3-butadiene,
1,1,4,4-tetrachloro-1,3-butadiene,
1,1,4,4-tetrabromo-1,3-butadiene,
1,1,4,4-tetraiodo-1,3-butadiene,
1,1,2,3-tetrachloro-1,3-butadiene,
1,1,2,3-tetrabromo-1,3-butadiene,
1,1,2,3-tetraiodo-1,3-butadiene,
1,1,2,3,4-pentachloro-1,3-butadiene,
1,1,2,3,4-pentabromo-1,3-butadiene,
1,1,2,3,4-pentaiodo-1,3-butadiene,
hexachloro-1,3-butadiene,
hexabromo-1,3-butadiene,
hexaiodo-1,3-butadiene,
1,3-dichloro-2-methyl-1,3-butadiene,
1,4-dichloro-2-methyl-1,3-butadiene,
1,1,4,4-tetrachloro-2-methyl-1,3-butadiene,
1,4-dichloro-2-chloromethyl-1,3-butadiene,
1,4-dichloro-2-dichloromethyl-1,3-butadiene,
1,1,4-trichloro-2-methyl-1,3-butadiene,
1,1,4,4-tetrachloro-2-methyl-1,3-butadiene,
1,1,4,4-tetrachloro-2-chloromethyl-1,3-butadiene,
1,3-dibromo-2-methyl-1,3-butadiene,
1,4-dibromo-2-methyl-1,3-butadiene,
1,1,4,4-tetrabromo-2-methyl-1,3-butadiene,
1,4-dibromo-2-bromethyl-1,3-butadiene,
1,4-dibromo-2-dibromomethyl-1,3-butadiene,
1,1,4-tribromo-2-methyl-1,3-butadiene,
1,1,4,4-tetrabromo-2-methyl-1,3-butadiene,
1,1,4,4-tetrabromo-2-bromomethyl-1,3-butadiene,
1,3-diiodo-2-methyl-1,3-butadiene,
1,4-diiodo-2-methyl-1,3-butadiene,
1,1,4,4-tetraiodo-2-methyl-1,3-butadiene,
1,4-diiodo-2-iodomethyl-1,3-butadiene,
1,1,4-triiodo-2-methyl-1,3-butadiene,
1,1,4,4-tetraiodo-2-methyl-1,3-butadiene,
1,1,4,4-tetraiodo-2-iodomethyl-1,3-butadiene, etc.;

halocycloalkadienes such as halogenated 1,3-cyclopentadienes which for purposes of this invention will be designated as halogenated cyclopentadienes including 1-chlorocyclopentadiene,
1,2-dichlorocyclopentadiene,
1,2,3-trichlorocyclopentadiene,
1,2,3,4-tetrachlorocyclopentadiene,
1,2,3,4,5-pentachlorocyclopentadiene,
hexachlorocyclopentadiene,
1-bromocyclopentadiene,
1,2-dibromocyclopentadiene,
1,2,3-tribromocyclopentadiene,
1,2,3,4-tetrabromocyclopentadiene,
1,2,3,4,5-pentabromocyclopentadiene,
hexabromocyclopentadiene,
1-iodocyclopentadiene,
1,2-diiodocyclopentadiene,
1,2,3-triiodocyclopentadiene,
1,2,3,4-tetraiodocyclopentadiene,
1,2,3,4,5-pentaiodocyclopentadiene,
hexaiodocyclopentadiene, etc.

It is also contemplated within the scope of this invention that polyhalo substituted conjugated cyclohexadienes such as 1,2-dichloro-1,3-cyclohexadiene,
1,2,3-trichloro-1,3-cyclohexadiene,
octachloro-1,3-cyclohexadiene, etc.,
1,2-dibromo-1,3-cyclohexadiene,
1,2,3-tribromo-1,3-cyclohexadiene,
octabromo-1,3-cyclohexadiene,
1,2-diiodo-1,3-cyclohexadiene,
1,2,3-triiodo-1,3-cyclohexadiene,
octaiodo-1,3-cyclohexadiene, etc., may also be used. In addition, it is also contemplated that polyhaloalkadienes and polyhalocycloalkadienes which are used in this process may contain more than one species of halo substitutents, such as, for example, 1,1-dichloro-3-bromo-1,3-butadiene,
1-chloro-3-bromo-1,3-butadiene,
1-iodo-3-chloro-1,3-butadiene,
2-bromo-3-chloro-1,3-butadiene,
1,4-dichloro-2-bromomethyl-1,3-butadiene,
1,4-dichloro-2-iodomethyl-1,3-butadiene,
1-chloro-2-bromocyclopentadiene,
1,2-dichloro-3-bromocyclopentadiene,
1,2-dichloro-5,5-dibromocyclopentadiene, etc., may be used although not necessarily with equivalent results.

N-(alkynyl)phenothiazines having the following general formula:

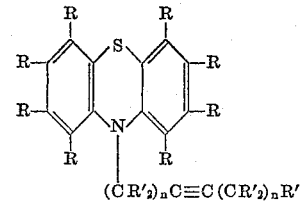

in which the R's are independently selected from the group consisting of hydrogen, alkyl, aryl, alkaryl, aralkyl and alkoxy radicals, and the R''s are independently selected from the group consisting of hydrogen and alkyl radicals, and the $n$'s are independently an integer of from 0 to about 12, the alkynyl radical being the most reaction of any substituents present, which may be condensed with the unsaturated halo compounds hereinbefore set forth include N-(ethynyl)phenothiazine,
N-(1-propynyl)phenothiazine,
N-(1-butynyl)phenothiazine,
N-(1-pentynyl)phenothiazine,
N-(1-hexynyl)phenothiazine, N-(1-heptynyl)phenothiazine,
N-(1-octynyl)phenothiazine,
N-(1-nonynyl)phenothiazine,
N-(1-dodecynyl)phenothiazine,
N-(1-tridecynyl)phenothiazine,
N-(1-tetradecynyl)phenothiazine, etc.,
1-methyl-N-(ethynyl)phenothiazine,
1-methyl-N-(1-propynyl)phenothiazine,
1-methyl-N-(1-butynyl)phenothiazine,
1-methyl-N-(1-pentynyl)phenothiazine,
1-methyl-N-(1-hexynyl)phenothiazine,
1-methyl-N-(1-heptynyl)phenothiazine,
1-methyl-N-(1-octynyl)phenothiazine,
1-methyl-N-(1-nonynyl)phenothiazine,
1-methyl-N-(1-decynyl)phenothiazine,
1-methyl-N-(1-undecynyl)phenothiazine,
1-methyl-N-(1-dodecynyl)phenothiazine,
1-methyl-N-(1-tridecynyl)phenothiazine,
1-methyl-N-(1-tetradecynyl)phenothiazine, etc.,
1-ethyl-N-(ethynyl)phenothiazine,
1-ethyl-N-(1-propynyl)phenothiazine,
1-ethyl-N-(1-butynyl)phenothiazine,
1-ethyl-N-(1-pentynyl)phenothiazine,
1-ethyl-N-(1-hexynyl)phenothiazine,
1-ethyl-N-(1-heptynyl)phenothiazine,
1-ethyl-N-(1-octynyl)phenothiazine,
1-ethyl-N-(1-nonynyl)phenothiazine,
1-ethyl-N-(1-decynyl)phenothiazine,
1-ethyl-N-(1-undecynyl)phenothiazine,
1-ethyl-N-(1-dodecynyl)phenothiazine,
1-ethyl-N-(1-tridecynyl)phenothiazine,
1-ethyl-N-(1-tetradecynyl)phenothiazine, etc.,
1,9-dimethyl-N-(ethynyl)phenothiazine
1,9-dimethyl-N-(1-propynyl)phenothiazine,
1,9-dimethyl-N-(1-butynyl)phenothiazine,
1,9-dimethyl-N-(1-pentynyl)phenothiazine,
1,9-dimethyl-N-(1-hexynyl)phenothiazine,
1,9-dimethyl-N-(1-heptynyl)phenothiazine,
1,9-dimethyl-N-(1-octynyl)phenothiazine,
1,9-dimethyl-N-(1-nonynyl)phenothiazine,
1,9-dimethyl-N-(1-decynyl)phenothiazine,
1,9-dimethyl-N-(1-undecynyl)phenothiazine,
1,9-dimethyl-N-(1-dodecynyl)phenothiazine,
1,9-dimethyl-N-(1-tridecynyl)phenothiazine,
1,9-dimethyl-N-(1-tetradecynyl)phenothiazine, etc.,
1,9-diethyl-N-(ethynyl)phenothiazine,
1,9-diethyl-N-(1-propynyl)phenothiazine,
1,9-diethyl-N-(1-butynyl)phenothiazine,
1,9-diethyl-N-(1-pentynyl)phenothiazine,
1,9-diethyl-N-(1-hexynyl)phenothiazine,
1,9-diethyl-N-(1-heptynyl)phenothiazine,
1,9-diethyl-N-(1-octynyl)phenothiazine,
1,9-diethyl-N-(1-nonynyl)phenothiazine,
1,9-diethyl-N-(1-decynyl)phenothiazine,
1,9-diethyl-N-(1-undecynyl)phenothiazine,
1,9-diethyl-N-(1-dodecynyl)phenothiazine,
1,9-diethyl-N-(1-tridecynyl)phenothiazine,
1,9-diethyl-N-(1-tetradecynyl)phenothiazine, etc.,
1,3-dimethyl-N-(ethynyl)phenothiazine,
1,3-dimethyl-N-(1-butynyl)phenothiazine,
1,3-dimethyl-N-(1-hexynyl)phenothiazine,
1,3-dimethyl-N-(1-octynyl)phenothiazine,
1,3-dimethyl-N-(1-decynyl)phenothiazine,
1,3-dimethyl-N-(1-dodecynyl)phenothiazine,
1,3-dimethyl-N-(1-tetradecynyl)phenothiazine, etc.,
1,4,6,9-tetramethyl-N-(ethynyl)phenothiazine,
1,4,6,9-tetramethyl-N-(1-butynyl)phenothiazine,
1,4,6,9-tetramethyl-N-(1-hexynyl)phenothiazine,
1,4,6,9-tetramethyl-N-(1-octynyl)phenothiazine,
1,4,6,9-tetramethyl-N-(1-decynyl)phenothiazine,
1,4,6,9-tetramethyl-N-(1-dodecynyl)phenothiazine,
1,4,6,9-tetramethyl-N-(1-tetradecynyl)phenothiazine, etc.,
1,4,6,9-tetraethyl-N-(ethynyl)phenothiazine,
1,4,6,9-tetraethyl-N-(1-butynyl)phenothiazine,
1,4,6,9-tetraethyl-N-(1-hexynyl)phenothiazine,
1,4,6,9-tetraethyl-N-(1-octynyl)phenothiazine,
1,4,6,9-tetraethyl-N-(1-decynyl)phenothiazine,
1,4,6,9-tetraethyl-N-(1-dodecynyl)phenothiazine,
1,4,6,9-tetraethyl-N-(1-tetradecynyl)phenothiazine, etc.,
1-phenyl-N-(ethynyl)phenothiazine,
1-phenyl-N-(1-butynyl)phenothiazine,
1-phenyl-N-(1-hexynyl)phenothiazine,
1-phenyl-N-(1-octynyl)phenothiazine,
1-phenyl-N-(1-decynyl)phenothiazine,
1-phenyl-N-(1-dodecynyl)phenothiazine,
1-phenyl-N-(1-tetradecynyl)phenothiazine, etc.,
1,9-diphenyl-N-(ethynyl)phenothiazine,
1,9-diphenyl-N-(1-butynyl)phenothiazine,
1,9-diphenyl-N-(1-hexynyl)phenothiazine,
1,9-diphenyl-N-(1-octynyl)phenothiazine,
1,9-diphenyl-N-(1-decynyl)phenothiazine,
1,9-diphenyl-N-(1-dodecynyl)phenothiazine,
1,9-diphenyl-N-(1-tetradecynyl)phenothiazine, etc.,
1-methoxy-N-(ethynyl)phenothiazine,
1-methoxy-N-(1-butynyl)phenothiazine,
1-methoxy-N-(1-hexynyl)phenothiazine,
1-methoxy-N-(1-octynyl)phenothiazine,
1-methoxy-N1(1-decynyl)phenothiazine,
1-methoxy-N-(1-decynyl)phenothiazine,
1-methoxy-N-(1-tetradecynyl)phenothiazine, etc.,
1,9-dimethoxy-N-(ethynyl)phenothiazine,
1,9-dimethoxy-N-(1-butynyl)phenothiazine,
1,9-dimethoxy-N-(1-hexynyl)phenothiazine,
1,9-dimethoxy-N-(1-octynyl)phenothiazine,
1,9-dimethoxy-N-(1-decynyl)phenothiazine,
1,9-dimethoxy-N-(1-dodecynyl)phenothiazine,
1,9-dimethoxy-N-(1-tetradecynyl)phenothiazine, etc.,
1,4,6,9-tetramethoxy-N-(ethynyl)phenothiazine,
1,4,6,9-tetramethoxy-N-(1-butynyl)phenothiazine,
1,4,6,9-tetramethoxy-N-(1-hexynyl)phenothiazine,
1,4,6,9-tetramethoxy-N-(1-octynyl)phenothiazine,
1,4,6,9-tetramethoxy-N-(1-decynyl)phenothiazine,
1,4,6,9-tetramethoxy-N-(1-dodecynyl)phenothiazine,
1,4,6,9-tetramethoxy - N - (1-tetradecynyl)phenothiazine, etc.,
1-ethoxy-N-(ethynyl)phenothiazine,
1-ethoxy-N-(1-butynyl)phenothiazine,
1-ethoxy-N-(1-hexynyl)phenothiazine,
1-ethoxy-N-(1-octynyl)phenothiazine,
1-ethoxy-N-(1-decynyl)phenothiazine,
1-ethoxy-N-(1-dodecynyl)phenothiazine,
1-ethoxy-N-(1-tetradecynyl)phenothiazine, etc.,
1,9-diethoxy-N-(ethynyl)phenothiazine,
1,9-diethoxy-N-(1-butynyl)phenothiazine,
1,9-diethoxy-N-(1-hexynyl)phenothiazine,
1,9-diethoxy-N-(1-octynyl)phenothiazine,
1,9-diethoxy-N-(1-decynyl)phenothiazine,
1,9-diethoxy-N-(1-dodecynyl)phenothiazine,
1,9-diethoxy-N-(1-tetradecynyl)phenothiazine, etc.

It is to be understood that the above enumerated N-(alkynyl)phenothiazines are only representatives of the class of compounds which may be used and that other N-(alkynyl)phenothiazines may be employed including N-(2-alkynyl)phenothiazines such as N-(2-propynyl)phenothiazine, N-(2-butynyl)phenothiazine, N-(2-pentynyl)phenothiazine, etc., N-(3-alkynyl)phenothiazines such as N-(3-pentynyl)phenothiazine, N-(3-hexynyl)phenothiazine, etc., as well as N-(1-isoalkynyl)phenothiazines such as N-(1-isobutynyl)phenothiazine, N-(1-isopentynyl)phenothiazine, etc., N-(3-isoalkynyl)phenothiazines such as N-(3-isohexynyl)phenothiazine, N-(3-isoheptynyl)phenothiazine, etc., although not necessarily with equivalent results, and therefore the present invention is not necessarily limited to the N-(1-alkynyl)phenothiazines; however, the N-(1-alkynyl)phenothiazines are the preferred reactants.

The aforementioned N-(alkynyl)phenothiazines are prepared by condensing a phenothiazine having the following formula:

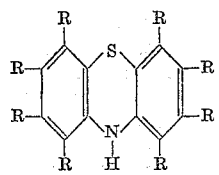

in which the R's are selected from the same group of radicals hereinbefore set forth, the amino radical containing an active hydrogen atom being the most reactive radical present in the compound, with a halo substituted alkyne such as chloroacetylene, bromoacetylene, iodoacetylene, chloroallylene (propargyl chloride), bromoallylene (propargyl bromide), iodoallylene (propargyl iodide), chloropentynes, chloroisopentynes, bromopentynes, bromoisopentynes, iodopentynes, iodoisopentynes, chlorohexynes, chloroisohexynes, bromohexynes, bromoisohexynes, iodohexynes, iodoisohexynes, chloroheptynes, chloroisoheptynes, bromoheptynes, bromoisoheptynes, iodoheptynes, iodoisoheptynes, chlorooctynes, chloroisooctynes, bromooctynes, bromoisooctynes, iodooctynes, iodoisooctynes, chlorononynes, bromononynes, iodononynes, chlorodecynes, bromodecynes, iododecynes, etc.

An example of the Diels-Alder type condensation reaction of the present process in which N-(1-propynyl) phenothiazine is reacted with 1,2-dichloro-1,3-butadiene and hexachlorocyclopentadiene respectively, may be illustrated by the following equations:

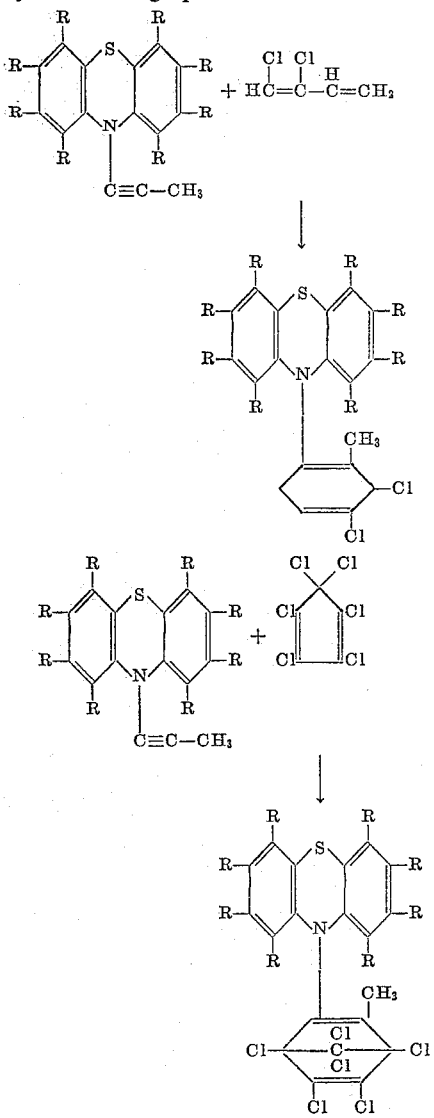

The physical properties of the present halocycloalkadienic derivatives of N-(alkynyl)phenothiazines and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as surface active agent, to the mixture of components. The latter solvents and dispersants may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example, in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of the present invention may be effected in any suitable manner and may comprise either a batch or a continuous type operation. For example, when a batch type operation is used, a quantity of the starting materials comprising the N-(alkynyl)phenothiazine in which the alkynyl side chain containing only carbon and hydrogen atoms is the most reactive substituent, and, if so desired, an inert organic solvent, is placed in a condensation apparatus provided with heating and mixing means. This apparatus may comprise either an alkylation flask or a rotating autoclave depending upon whether or not superatmospheric pressures are required to effect the condensation in the liquid phase. The condensation apparatus is adjusted to the desired temperature and pressure, and the haloalkadiene or halocycloalkadiene is added thereto at a predetermined rate, the temperature of the flask being maintained at the desired level for a predetermined residence time. At the end of this time the apparatus and contents thereof are allowed to cool to room temperature, the excess pressure if any is vented, and the desired reaction product is separated from unreacted starting materials by conventional means such as fractional distillation, crystallization, etc. Alternatively, the reactants and solvent, if any, may be first admixed and then heated to the desired reaction temperature.

Another method of effecting the Diels-Alder condensation reaction of the present invention is by a continuous type operation. In this type of operation the starting materials are continuously charged to a reaction zone which is maintained at the proper operating conditions of temperature and pressure. The reactor may comprise an unpacked vessel or coil or may be lined with an adsorbent packing material such as fire brick, dehydrated bauxite, alumina or the like. If so desired, an inert organic solvent of the type hereinbefore set forth may be added through a separate line or may be admixed with one or the other of the starting materials prior to entry into said reaction zone and charged thereto in a single stream. The reaction product is continuously withdrawn from the reaction zone, separated from the reactor effluent and purified by conventional means hereinbefore set forth, while the unreacted starting materials are separated and recharged to the reactor with a portion of the feed stock.

Examples of reaction products which are prepared according to the present process comprise those compounds having the generic formulae:

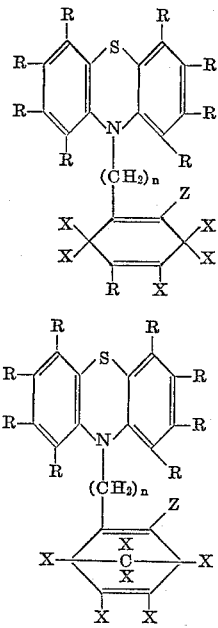

in which the R, X, Z and $n$ substituents have the same meaning as hereinbefore set forth and include 1-methyl-N-(3,4-dichloro-1,4-cyclohexadien-1-yl)-phenothiazine,
1-ethyl-N-(3,4-dichloro-1,4-cyclohexadien-1-yl)phenothiazine,
1,2-dimethyl-N-(3,4-dichloro-1,4-cyclohexadien-1-yl)-phenothiazine,
1,2-diethyl-N-(3,4-dichloro-1,4-cyclohexadien-1-yl)-phenothiazine,
1-methoxy-N-(3,4-dichloro-1,4-cyclohexadien-1-yl)-phenothiazine,
1-ethoxy-N-(3,4-dichloro-1,4-cyclohexadien-1-yl)phenothiazine,
1,2-methoxy-N-(3,4-dichloro-1,4-cyclohexadien-1-yl)-phenothiazine,
1,2-ethoxy-N-(3,4-dichloro-1,4-cyclohexadien-1-yl)-phenothiazine,
1-methyl-N-(2-methyl-3,4-dichloro-1,4-cyclohexadien-1-yl)phenothiazine,
1-ethyl-N-(2-methyl-3,4-dichloro-1,4-cyclohexadien-1-yl)phenothiazine,
1,2-dimethyl-N-(2-methyl-3,4-dichloro-1,4-cyclohexadien-1-yl)phenothiazine,
1,2-diethyl-N-(2-methyl-3,4-dichloro-1,4-cyclohexadien-1-yl)phenothiazine,
1-methoxy-N-(2-methyl-3,4-dichloro-1,4-cyclohexadien-1-yl)phenothiazine,
1-ethoxy-N-(2-methyl-3,4-dichloro-1,4-cyclohexadien-1-yl)phenothiazine,
1,2-methoxy-N-(2-methyl-3,4-dichloro-1,4-cyclohexadien-1-yl)phenothiazine,
1,2-ethoxy-N-(2-methyl-3,4-dichloro-1,4-cyclohexadien-1-yl)phenothiazine,
1-methyl-N-(2-methyl-3,4,5,6-tetrachloro-1,4-cyclohexadien-1-yl)phenothiazine,
1-ethyl-N-(2-methyl-3,4,5,6-tetrachloro-1,4-cyclohexadien-1-yl)phenothiazine,
1,2-dimethyl-N-(2-methyl-3,4,5,6-tetrachloro-1,4-cyclohexadien-1-yl)phenothiazine,
1,2-diethyl-N-(2-methyl-3,4,5,6-tetrachloro-1,4-cyclohexadien-1-yl)phenothiazine,
1-methoxy-N-(2-methyl-3,4,5,6-tetrachloro-1,4-cyclohexadien-1-yl)phenothiazine,
1-ethoxy-N-(2-methyl-3,4,5,6-tetrachloro-1,4-cyclohexadien-1-yl)phenothiazine,
1,2-methoxy-N-(2-methyl-3,4,5,6-tetrachloro-1,4-cyclohexadien-1-yl)phenothiazine,
1,2-ethoxy-N-(2-methyl-3,4,5,6-tetrachloro-1,4-cyclohexadien-1-yl)phenothiazine,
1,2-methoxy-N-(1,4,5,6,7,7-hexachloro-2,5-norbornadien-2-yl)phenothiazine,
1,2-ethoxy-N-(1,4,5,6,7,7-hexachloro-2,5-norbornadien-2-yl)phenothiazine,
1-methyl-N-(1,4,5,6,7,7-hexachloro-2,5-norbornadien-2-yl)phenothiazine,
1-ethyl-N-(1,4,5,6,7,7-hexachloro-2,5-norbornadien-2-yl)phenothiazine,
1,2-dimethyl-N-(1,4,5,6,7,7-hexachloro-2,5-norbornadien-2-yl)phenothiazine,
1,2-diethyl-N-(1,4,5,6,7,7-hexachloro-2,5-norbornadien-2-yl)phenothiazine,
3,7-dimethyl-N-(1,4,5,6,7,7-hexachloro-2,5-norbornadien-2-yl)phenothiazine,
3,7-diethyl-N-(1,4,5,6,7,7-hexachloro-2,5-norbornadien-2-yl)phenothiazine,
1,3,7,9-tetramethyl-N-(3-methyl-1,4,5,6,7,7-hexachloro-2,5-norbornadien-2-yl)phenothiazine,
1,3,7,9-tetraethyl-N-(3-methyl-1,4,5,6,7,7-hexachloro-2,5-norbornadien-2-yl)phenothiazine,
1-methyl-N-(3-methyl-1,4,5,6,7,7-hexachloro-2,5-norbornadien-2-yl)phenothiazine,
1-ethyl-N-(3-methyl-1,4,5,6,7,7-hexachloro-2,5-norbornadien-2-yl)phenothiazine,
1,2-dimethyl-N-(3-methyl-1,4,5,6,7,7-hexachloro-2,5-norbornadien-2-yl)phenothiazine,
3,7-dimethoxy-N-(3-methyl-1,4,5,6,7,7-hexachloro-2,5-norbornadien-2-yl)phenothiazine,
3,7-diethoxy-N-(3-methyl-1,4,5,6,7,7-hexachloro-2,5-norbornadien-2-yl)phenothiazine, etc.

It is to be understood that the aforementioned compounds are only examples of the type of reaction products which are obtained when using the process of the present invention and that said invention is not necessarily limited thereto.

The following examples are given to illustrate the process of the present invention, which, however, are not intended to limit the generally broad scope of the present invention in strict accordance therewith.

*Example I*

A mixture of 12.3 g. (0.1 mole) of 1,2-dichloro-1,3-butadiene and 23.7 g. (0.1 mole) of N-(1-propynyl)-phenothiazine dissolved in 50 g. of toluene is refluxed at a temperature of about 110° C. for a period of about 6 hours during which time the inert solvent, toluene, is distilled over until the reaction temperature reaches approximately 200° C. The reaction is maintained at this temperature for an additional 2 hours after which the vessel and contents thereof are allowed to cool to room temperature and the reaction product is recovered, washed, dried and distilled under reduced pressure. The desired product, comprising N-(2-methyl-3,4-dichloro-1,4-cyclohexadien-1-yl)phenothiazine is separated and recovered.

*Example II*

A solution of 23.7 g. (0.1 mole) of N-(1-propynyl)-phenothiazine and 28.5 g. (0.1 mole) of hexachlorocyclopentadiene dissolved in 50 g. of o-xylene is heated under reflux for a period of about 5 hours during which time the xylene is distilled over until the reaction temperature reaches a maximum of about 225° C. At the end of this time the flask and contents thereof are allowed to cool to room temperature and the reaction product is recovered, washed, dried and subjected to fractional distillation under reduced pressure. The desired product, comprising N - (3 - methyl - 1,4,5,6,7,7 - hexachloro-2,5-norbornadien-2-yl)phenothiazine is separated and recovered therefrom.

*Example III*

A solution of 23.7 g. of N-(1-propynyl)phenothiazine and 19.2 g. of 1,2,3,4-tetrachloro-1,3-butadiene in 50 g. of benzene is heated under reflux for a period of about 5 hours, after which the product is recovered and treated as described for the products of Examples I and II above. The desired product, comprising N-(2-methyl-3,4,5,6-tetrachloro-1,4-cyclohexadien-1-yl)phenothiazine is separated and recovered therefrom.

*Example IV*

A solution of 25.1 g. (0.1 mole) of N-(1-butynyl)-phenothiazine and 21.2 g. (0.1 mole) of 1,2-dibromo-1,3-butadiene in 50 g. of xylene is treated as described in Examples I to III above. The desired product, comprising N - (2 - ethyl - 3,4 - dibromo - 1,4 - cyclohexadien-1-yl)phenothiazine is separated and recovered by fractional distillation under reduced pressure.

*Example V*

A solution of 22.3 g. (0.1 mole) of N-(ethynyl)phenothiazine and 55.2 g. (0.1 mole) of hexabromocyclopentadiene in 50 g. of toluene is treated as described in Examples I to IV above. The desired product comprising N - (1,4,5,6,7,7-hexabromo-2,5-norbornadien-2-yl)phenothiazine is separated and recovered by fractional distillation under reduced pressure.

*Example VI*

An insecticidal solution is prepared by dissolving 1 g. of N-(3-methyl-1,4,5,6,7,7-hexachloro-2,5-norbornadien-2-yl)phenothiazine in 2 cc. of benzene and adding 100 cc. of water using Triton X–100 as an emulsifying agent. This solution is sprayed into a cage containing common houseflies and causes a 100% knock-down. Similar tests using the compounds prepared according to Examples II to V with benzene and water will show similar results.

I claim as my invention:

1. A process for the preparation of N-(2-methyl-3,4-dichloro - 1,4 - cyclohexadien-1-yl)phenothiazine which comprises condensing 1,2-dichloro-1,3-butadiene with N-(1-propynyl)phenothiazine at a temperature in the range of from about 150° to about 200° C. and at a pressure in the range of from about atmospheric to about 100 atmospheres.

2. A process for the preparation of N-(3-methyl-1,4,5,67,7 - hexachloro-2,5-norbornadien-2-yl)-phenothiazine which comprises condensing N-(1-propynyl)phenothiazine with hexachlorocyclopentadiene at a temperature in the range of from about 150° to about 200° C. and at a pressure in the range of from about atmospheric to about 100 atmospheres.

3. A process for the preparation of N-(2-methyl-3,4,5,6-tetrachloro - 1,4-cyclohexadien-1-yl)phenothiazine which comprises condensing N-(1-propynyl)phenothiazine with 1,2,3,4-tetrachloro-1,3-butadiene at a temperature in the range of from about 150° to about 200° C. and at a pressure in the range of from about atmospheric to about 100 atmospheres.

4. A process for the preparation of N-(2-ethyl-3,4-dibromo-1,4-cyclohexadien-1-yl)phenothiazine which comprises condensing N-(1-butynyl)phenothiazine with 1,2-dibromo-1,3-butadiene at a temperature in the range of from about 150° to about 200° C. and at a pressure in the range of from about atmospheric to about 100 atmospheres.

5. A process for the preparation of N-(1,4,5,6,7,7-hexabromo-2,5-norbornadien-2-yl)phenothiazine which comprises condensing N-(ethynyl)phenothiazine with hexabromocyclopentadiene at a temperature in the range of from about 150° to about 200° C. and at a pressure in the range of from about atmospheric to about 100 atmospheres.

6. A compound selected from the group consisting of:

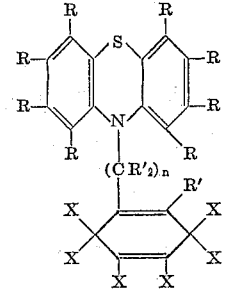

and

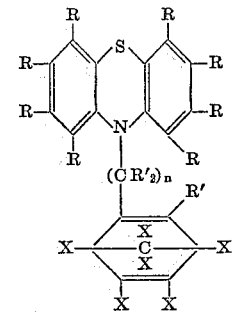

in which the R's are independently selected from the group consisting of hydrogen, methyl, ethyl, phenyl, methoxy and ethoxy radicals, the R''s are independently selected from the group consisting of hydrogen and alkyl radicals containing from 1 to about 12 carbon atoms, the X's are independently selected from the group consisting of hydrogen, chlorine, bromine and iodine, at least one X being halogen, and $n$ is an integer of from 0 to about 12.

7. N - (2-methyl-3,4-dichloro-1,4-cyclohexadien-1-yl)-phenothiazine.

8. N - (3-methyl-1,4,5,6,7,7-hexachloro-2,5-norbornadien-2-yl)phenothiazine.

9. N - (2-methyl-3,4,5,6-tetrachloro-1,4-cyclohexadien-1-yl)phenothiazine.

10. N-(3-ethyl-3,4-dibromo-1,4-cyclohexadien - 1 - yl)-phenothiazine.

11. N-(1,4,5,6,7,7 - hexabromo - 2,5 - norbornadien-2-yl)phenothiazine.

References Cited in the file of this patent
UNITED STATES PATENTS
2,868,788    Luvisi _____ Jan. 13, 1959

OTHER REFERENCES

Raphael: "Acetylenic Compounds in Organic Synthesis," pages 150 to 152. Academic Press Inc., New York, (1955).

Ungnade et al.: Chemical Reviews, vol. 58, pages 254–7 (1958).